(12) United States Patent
Draggon et al.

(10) Patent No.: US 6,529,804 B1
(45) Date of Patent: *Mar. 4, 2003

(54) METHOD OF AND APPARATUS FOR ENABLING THE SELECTION OF CONTENT ON A MULTI-MEDIA DEVICE

(75) Inventors: Dave Draggon, Tempe, AZ (US); Joseph Michels, Scottsdale, AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/707,537

(22) Filed: Nov. 7, 2000

(51) Int. Cl.[7] ............................. G06F 7/00; G06F 17/00
(52) U.S. Cl. ........................ 701/1; 340/425.5; 386/46; 386/96; 345/716
(58) Field of Search ........................ 701/24, 1, 200–25, 701/28; 709/204, 217, 206, 203; 340/425.5; 370/260, 270, 352; 386/46, 125, 126, 96; 84/609; 345/840, 823, 861, 753, 716; 348/42, 47; 434/307 A

(56) References Cited

U.S. PATENT DOCUMENTS

| 6,133,853 | A | * | 10/2000 | Obradovich et al. | ........ 340/905 |
|---|---|---|---|---|---|
| 6,175,782 | B1 | * | 1/2001 | Obradovich et al. | ........... 701/1 |
| 6,237,025 | B1 | * | 5/2001 | Ludwig et al. | ............. 709/204 |
| 6,248,946 | B1 | | 6/2001 | Dwek | ..................... 434/307 A |
| 6,314,094 | B1 | * | 11/2001 | Boys | ......................... 370/352 |
| 2001/0018858 | A1 | * | 9/2001 | Dwek | |

* cited by examiner

Primary Examiner—Thomas G. Black
Assistant Examiner—Ronnie Mancho
(74) Attorney, Agent, or Firm—Kevin D. Wills

(57) ABSTRACT

The user interface disclosed in the present disclosure allows the user to 'tune' to a 'content' station just like he is accustomed to tuning to a radio station. The channel band GUI presents various content or feature bands as rotating belts of icons with each icon representing a channel on the band. The use of graphical belts enables a dynamic number of channels per band and the dynamic number of bands. The graphical presentation of the bands includes the presentation of sub-band "visual hints" as a user highlights a channel on a given band. Provided that there is sufficient room on the display, a super-band visual hint can be used to indicate to the user that the current band is a sub-band. The user tunes to a channel by rotating a dial and selecting a channel from the band. A channel can be 'fine tuned' by rotating the dial within the channel 'band' and making a selection that presents a sub-band for that channel.

17 Claims, 12 Drawing Sheets

METHOD OF AND APPARATUS FOR ENABLING THE SELECTION OF CONTENT ON A MULTI-MEDIA DEVICE

FIELD OF THE INVENTION

This invention generally relates to a multimedia device interface, and more particularly, to a method for enabling the selection of content on a multi-media device.

BACKGROUND OF THE INVENTION

Radios in vehicles have historically received only amplitude modulation (AM) band and frequency modulation (FM) band terrestrial radio broadcasts. AM and FM radio stations have a transmission range limited to a relatively small geographic area by government regulations. Because the number of broadcasts that can be received in most geographic areas has been relatively small, selecting a broadcast to hear in a vehicle has traditionally required no more than four types of simple receiver controls: an AM/FM band selector, a tuning control to allow the listener to manually scan all possible broadcast frequencies within a band, a scan control that finds and plays a few seconds of each station that has sufficient signal strength to be clearly heard, and a small number of preset push buttons that can each be programmed by the listener to tune to one radio station of a set band and frequency.

As mobile devices having displays become more common and a greater volume of content can be transmitted to such devices, it is necessary to create a user interface of display which enables the selection of such content. When a display is used in a moving vehicle, such displays must be user friendly to enable the efficient operation with a small display, particular when only a single DIN slot is allocated.

Accordingly, there is a need for a user interface for enabling the selection of content on a multi-media device, such as a communication device in a vehicle.

DETAILED DESCRIPTION OF THE DRAWINGS

The user interface disclosed in the present disclosure is based on the paradigm of radio or television channels, and bridges the gap between the action of tuning a conventional radio and the action of making a content selection on the internet. The user interface allows the user to 'tune' to a 'content' station just like tuning to a radio station. The user interfaces presents various content or feature bands as rotating belts of icons with each icon representing a channel on the band. The use of graphical belts enables a dynamic number of channels per band and the dynamic number of bands. The graphical presentation of the bands includes the presentation of sub-band "visual hints" as a user highlights a channel on a given band. Provided that there is sufficient room on the display, a super-band visual hint can be used to indicate to the user that the current band is a sub-band. The user tunes to a channel by rotating a dial, or selector, and selecting a channel from the band. A channel can be 'fine tuned' by rotating the dial within the channel 'band' and making a selection that presents a sub-band for that channel. In addition to conventional radio features, other features embodied as computer applications include channels that are tunable. Each selected channel can then be "fine tuned" or have its attributes exposed and manipulated to provide a service, such as navigation. Content can be exposed by the initial level of tuning, by fine-tuning or by manipulating a channel's attributes.

The user interface of the present disclosure has a variety of "radio bands" just as there is an AM and FM band. It is also possible to have sub-bands. A band may contain either more sub-bands or channels. Channels are final "tuning" destinations for a user, just as 91.5, MHz on the FM band is a channel. That is, a channel is a final tuning destination, and contains content, such as a radio station or tracks on a CD. Content objects can be acted upon as in a noun/verb pare such as Song/buy, phone number/dial, address/navigate to, etc. according to the present invention. A set of content can be organized as a play list such that the content is played one after the other, just as tracks on a CD can be made into a play list and played one after another. A user can use a "selector" to tune channels or sub-bands. Bands and channels can be moved around, allowing the user to customize existing or create their own personalized bands. Content will not be enabled to moved around the bands. For example, an address entry can be a channel and therefore can be placed anywhere on a band, while phone number is content and can't be placed on a band.

Figure 1:
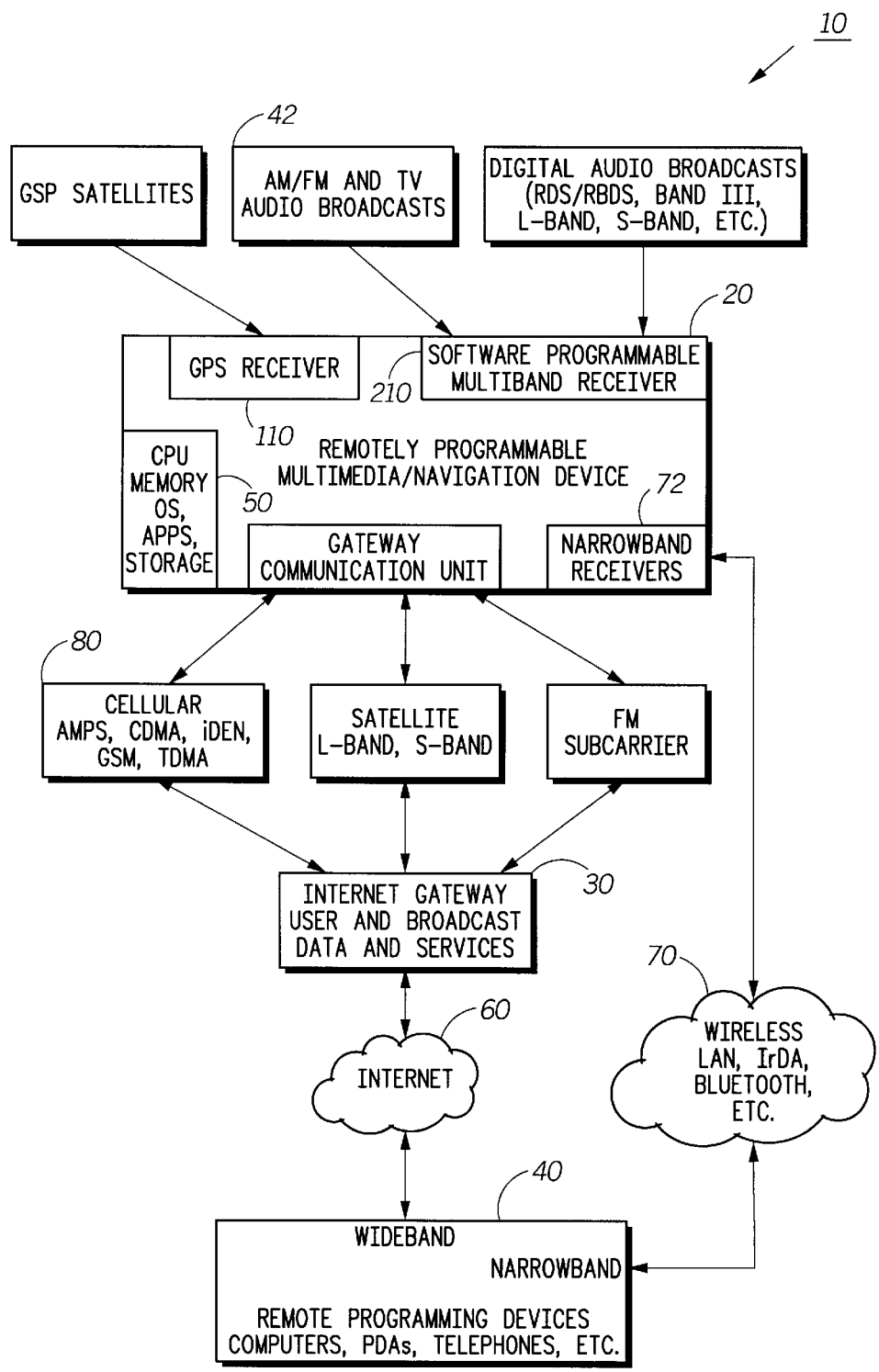
FIG. 1 shows a block diagram of a system overview.

Referring to the drawings, where like elements receive like reference numerals throughout, the invention generally is a user interface for enabling the selection of content on a multimedia device. As shown in FIG. 1, the invention consists of (1) a remotely programmable, microcomputer controlled multimedia device with a wireless IP address for Internet access, (2) an Internet gateway network 30 that provides programming, information and Internet access to the multimedia device 20, and (3) one or more remote programming devices 40.

The multimedia device 20 includes a computer 50 that preferably runs an operating system and series of applications that control the operation of the device 20. A user operates an application by tuning to a "channel" in keeping with the known radio paradigm and its user friendly operations. The two types of channels preferably available are audio broadcasts (e.g., AM, FM, TV, digital, Internet audio broadcasts and recorded material) and personal information services (e.g., navigation, email, traffic alerts, etc.). Channels are organized in a hierarchy 158 so any one can be easily selected on screen (see FIG. 2). Audio broadcast channels 42 are organized by the format of the broadcast (i.e., country, rock, talk, etc.) and not by the band or frequency of the station. The listener configures the organization of the channels through a remote device 40 via the Internet gateway network 30.

Figure 3:
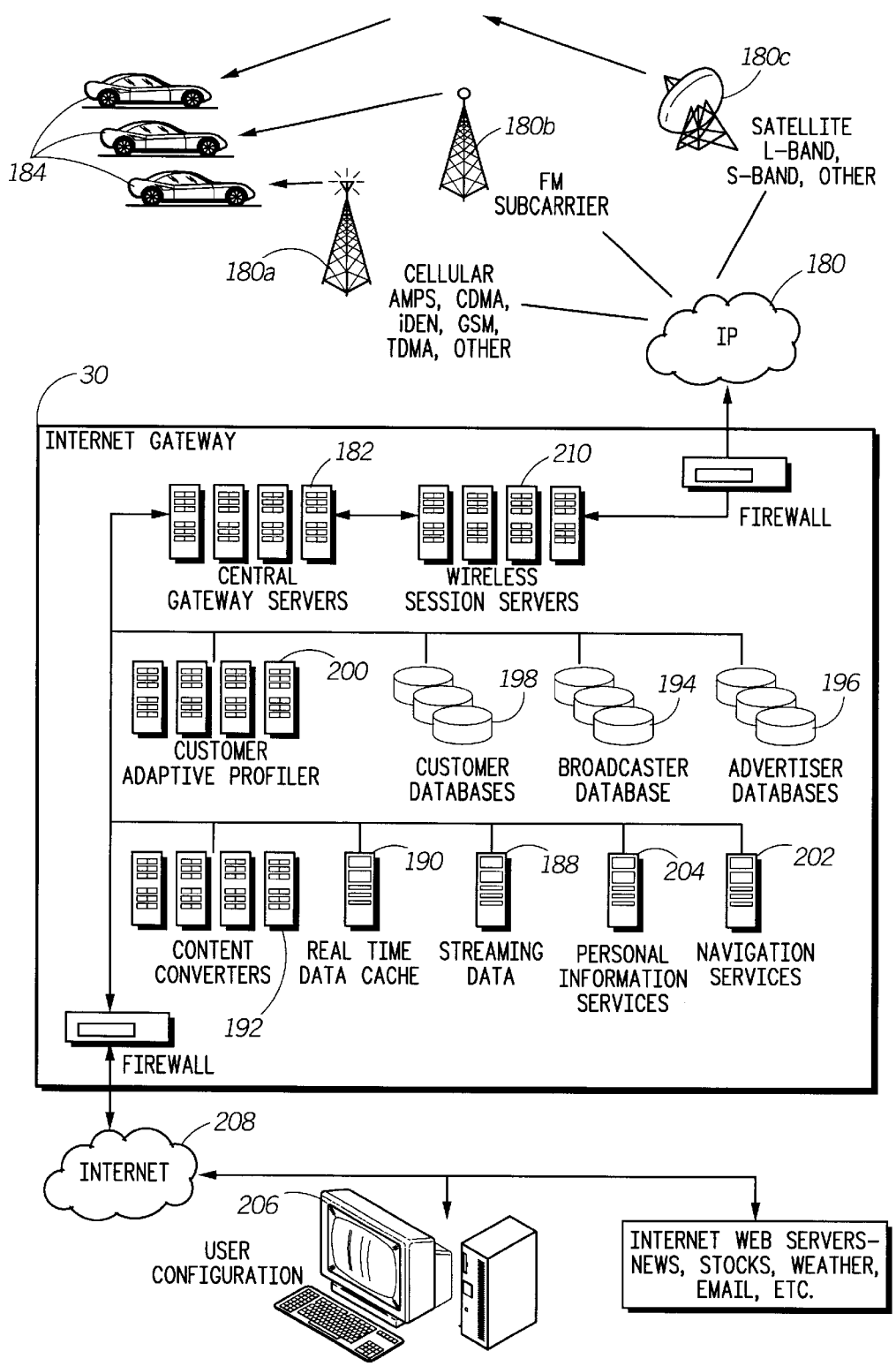
FIG. 3 shows a system diagram of an internet gateway network.

The Internet gateway network 30 is designed to transmit and receive critical information to and from a multimedia device 20 in the vehicle 184 (FIG. 3). Information transmitted preferably includes broadcaster identification that allows the multimedia device 20 to tune to stations by their formats, direct Internet access for streaming audio broadcasts and other Internet content, broadcast advertising database lookup for direct response to advertisements heard in a vehicle, navigation services, delayed digital personalized broadcasts, personal information event notices, and application downloads to create new personal information channels.

Remote programmable devices 40, such as a computer connected to the Internet 60, are used to download information from the Internet gateway network 30 to the multimedia device 20 in the vehicle 184. From a remote device 40, a user can customize the way audio broadcasts and personal information service channels are organized in the vehicle's multimedia device 20, can request new personal information services be downloaded from the Internet gateway 30 to the multimedia device 20, and can retrieve information from the gateway 30 that he has stored there from the vehicle 184. The user can also access his custom profile and billing information records.

FIG. 1 shows many possible wireless communication methods between the vehicle device and the gateway. As those skilled in the art will appreciate, the methods illustrated in FIG. 1 are meant to be representative and do not reflect all possible wireless communication methods that may be employed.

Figure 2:
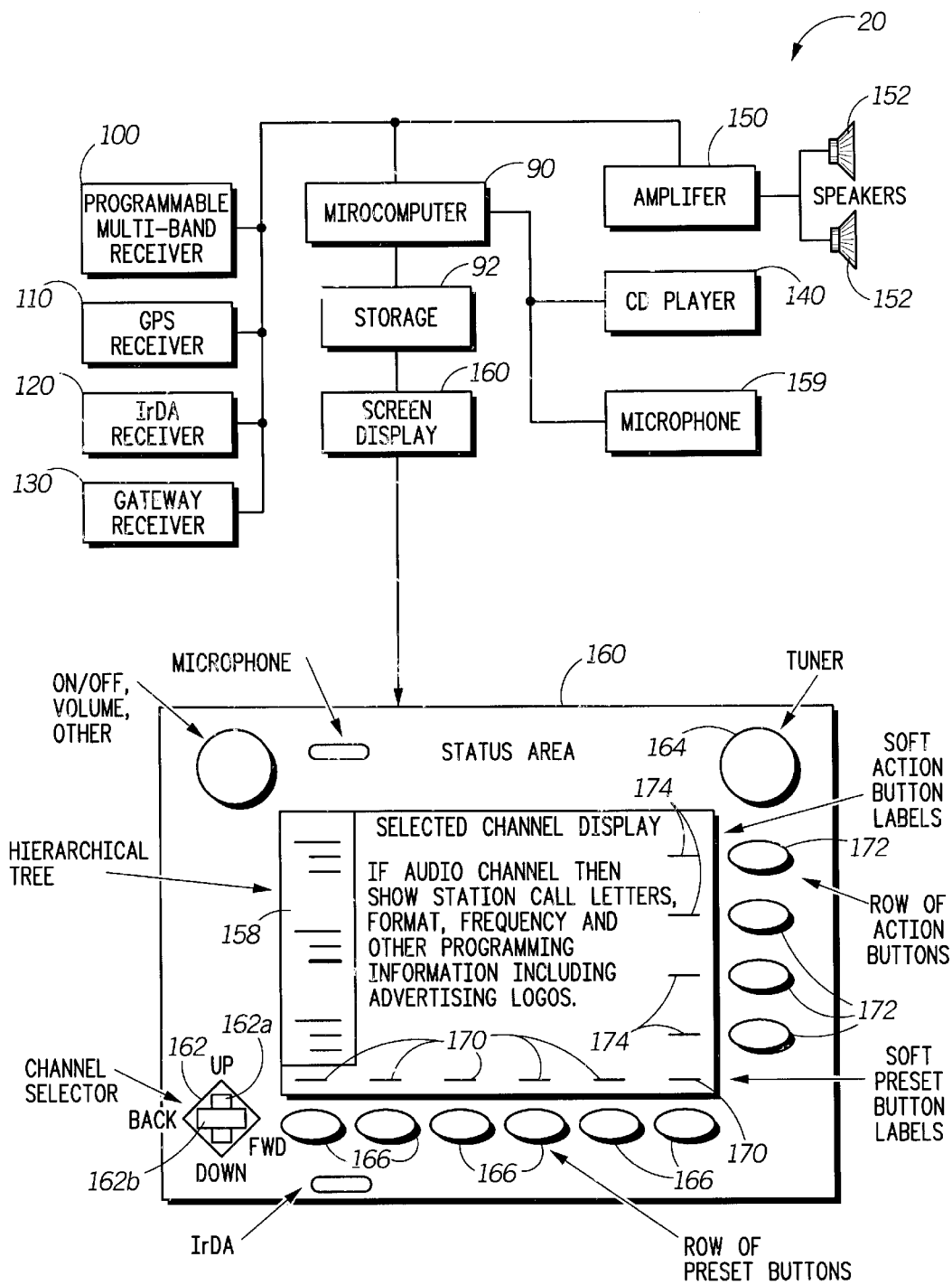
FIG. 2 shows a block diagram of a vehicle multimedia receiver.

As FIGS. 1 and 2 show, the multimedia device 20 consists of a computer 50 preferably having a microprocessor and memory 90, and storage devices 92 that contain and run an operating system and applications to control and communicate with four onboard receivers: (1) a software controlled multi-band AM, FM, TV audio and digital audio broadcast receiver 100; (2) a GPS receiver 110 that continuously reports the vehicle's longitude, latitude and altitude; (3) one or more high-speed, narrow band wireless transceivers 120 for fast transmission and reception of large amounts of data from accommodated devices; and (4) a wide band wireless Internet addressable gateway transceiver 130 to receive Internet protocol based audio broadcasts, new applications known as information or data channels, and configuration data from a gateway network 30 created to service the multimedia devices 20. The in-vehicle wireless gateway transceiver 130 can also send information to the gateway network 30 such as requests for navigation data, advertisement responses, purchase requests, etc. The multimedia device 20 also controls attached conventional multimedia storage equipment such as a CD/DVD player 140 or cassette player (not shown). Sound is output through an industry standard amplifier 150 and speakers 152. A microphone 154 allows for voice recognition commands to be given and received by the multimedia device 20.

The multimedia device 20 preferably also contains and controls one or more digital storage devices 92 to which real-time broadcasts can be digitally recorded. The storage devices 92 may be hard drives, flash disks, or other automotive grade storage media. The same storage devices 92 can also preferably store digital data that is wirelessly transferred to the vehicle in faster than real time mode. Examples of such digital materials are MP3 audio files or nationally syndicated radio shows that can be downloaded from the gateway network 30 and played back when desired rather than when originally broadcast.

As FIG. 2 shows, the multimedia device also uses a LCD, LED or similar suitable display screen 160 for an automotive environment to present information to the user and to control the multimedia device 20. Controls shown on the LCD in FIG. 2 are one possible embodiment for control types and location. Those skilled in the art will appreciate that control types and locations may vary in different implementations of the invention. In one presently preferred embodiment, for example, the display screen 160 includes a 5½ inch 640×480, 216 color VGA LCD display 168. In an alternate embodiment, the display can display as little as two lines of text, whereas an upper limit of the screen display 168 can be as large as the intended application may dictate.

The channel selector 162, tuner 164 and preset button 166 controls shown in FIG. 2 allow the user to broadly navigate all the channels of audio broadcasts and information services available on the multimedia device 20. The channel selector 162 allows a user to manually access and select any of the audio and information channels available by browsing through them (up, down, forward, back) in a hierarchical tree 158. A portion of the hierarchical tree 158 is shown on the screen display 160. The root of the hierarchical tree 158, the leftmost part, preferably contains major categories of channels. Possible types of major channel categories could include music, talk, TV audio, recorded audio, personalized directory services and information services. As is explained in detail below, the user can configure the presentation of major categories and subcategories so that he/she sees only those categories of interest.

Under each major channel category, there are preferably subcategories. To see these subdivisions, the user would select the desired major category by pressing the up or down channel selector buttons 162a and then press the forward button 162b when the category desired is highlighted. The user could then see all the channels available under that subcategory in similar fashion and select any of them to play. For example, under the category of music channels, commercial audio broadcasts could be subdivided into 30+ radio industry standard formats (e.g., blues, classical, county, dance, jazz, rock, sports, talk, etc.). To hear a particular country music radio station in a particular geographic area, a user would select the "Music" category by pressing the up or down channel selector buttons 162a and then press the forward channel selector 162b when positioned on "Music." Next, the user would use the up or down channel selector buttons 162a to highlight "Country" and would then press the forward button 162b. The user would then see all the country music channels available in that specific area. Moving the channel selector 162 up or down over each channel preferably causes each audio station to play.

Once a user has moved forward in the hierarchical tree, the subcategory or channels displayed will remain visible until the user presses the back channel selection button 162b that moves the user back up the tree one level. For example, to move back from country broadcasts to select other music formats, the user would press the back button 162b and then select another music format. The multimedia device 20 may be preferably configured so that the last hierarchical display and selection the user made is presented when the device is next turned on.

Preset buttons 166 on the display screen 160 are user configurable buttons that allow the user to select any one channel, group of channels or even channels from different categories that can be played or displayed with the press of a single button. For example, a user could configure a preset button 166 to simply play a favorite country station when pressed. The user could also configure a preset button 166 to display all the country stations in a specific area. The user could even configure a preset button 166 to display their favorite blues, country and rock stations at one time on one screen display 168. Once these groups of channels are displayed, the user can play the radio stations by using the channel selector buttons 166. A preset button 166 can also be assigned to any personal information channel application. For example, assigning a new channel (application) that shows all hospitals in an area would result in a map showing the nearest hospitals to the vehicle's current position when the preset is pushed. User defined labels 170 for preset buttons 166 preferably appear on the screen 168 above the preset buttons 166 to indicate their purpose.

The tuner control 164 shown in FIG. 2 flattens the hierarchical tree. Rather than having to step through categories and subcategories to play a channel, by turning the tuner control 164 the user can play each channel one after the other in the order they appear in the hierarchy 158. If a user has configured the device to show only a few categories of channels, this allows fast sequencing through a channel list. Pressing the tuner control 164 preferably causes the device to scan through the channels as a traditional radio would do, playing a few seconds of each station before moving to the next in the hierarchy 158.

Computer programs running in the multimedia device 20 control the action buttons 172 shown in FIG. 2. Action buttons labels 174 and purposes may change from program to program. A button's label 174 indicates its current function. Some examples of action buttons 172 could be: "INFO" to save extended information on something that is being broadcast (e.g., the Internet web address of a band currently playing); "CALL" to call a phone number from an advertisement; "NAV" to navigate to an address from an electronic address book; or "BUY" to purchase an item currently being advertised.

A microphone input 176 on the face of the display 160 allows users to control the multimedia device 20 verbally rather than through the control buttons. Key word recognition software allows the user to make the same channel selections that could be made from any of the button controls. Audio feedback through speech synthesis allows the user to make selections and hear if any other actions are required. Software or hardware based voice recognition and speech synthesis may be used to implement this feature.

FIG. 3 shows a system drawing of the Internet Gateway Network 30. The Internet gateway network 30 preferably consists of standard Internet TCP/IP protocol communications equipment 180 and computers 182 that serve multiple functions. The gateway 30 is designed to provide wireless Internet access to the multimedia device 20 in the vehicle 184, enhance regular audio broadcasts with extended information, and provide personalized broadcast, information and applications to the vehicle 184.

The gateway 30 serves as an Internet Service Provider to vehicles 184 through various forms of wireless transmission 186. Cellular access is expected to provide the initial form of wireless transmission with satellite transmissions to follow. In some implementations, requests from the vehicle 184 may come through the cellular network 186a while responses may be routed through FM sub-carriers 186b or faster satellite networks 186c. Wireless session servers 210 are preferably dedicated to maintaining connections with the rest of the gateway network 30 no matter what form of transmission is used.

To insure adequate throughput to vehicles 184, the gateway network 30 will cache most requested Internet data in a real time data cache 190, as well as convert retrieved Internet content through content converts 192 for appropriate display or verbalization on the multimedia device 20. Dedicated streaming data servers 188 will be used to broadcast personalized audio broadcasts to the vehicle 184, as well as rebroadcast other Internet audio broadcasts.

The Internet gateway network 30 also maintains a database management system to control several important system databases. The gateway 30 provides a broadcaster relational database 194 containing information about all AM, FM and TV analog audio broadcasts that can be received in a vehicle 184 within the host nation of the gateway network 30 (e.g., radio station call letters, programming format, frequency assignment, program listing, etc.). Related databases (not shown) may maintain similar information for new digital broadcasters such as satellite radios who transmit over large geographic areas and for international Internet audio broadcasts. Information in the database concerning constantly changing program listings (e.g., song play lists, etc.) are preferably continuously updated throughout a day.

Advertising databases 196 provide information about advertisements (e.g., advertiser name, ad content, time of ad run, etc.) that are inserted into real-time radio broadcasts and into digital personalized broadcasts. In one embodiment of the system 10, when a user wishes to purchase a product or get more information about a product while in the vehicle 184, the user can press a "BUY" or "INFO" button on the multimedia device 20, which transmits to the gateway network 30 the location of his vehicle 184 (GPS derived), the date and time of the button press, and the channel selected. The advertised item is then looked up in the database 196, and the user is charged for its delivery or is sent more information about the product. In an alternative embodiment, enhanced advertising information for short periods of time may be pushed to the multimedia device 20 from the gateway 30 at set intervals. Only those ads offering immediate purchase or additional information will preferably show indicators for these actions.

User profile databases 198 contain information about the user's system preferences (e.g., channels selected), billing information and a purchasing interest profile. Information in advertising databases can be compared against a user's purchasing interest profile through an adaptive profiler 200 so that advertisements inserted into delayed personalized digital broadcasts mesh with that individual's buying interests. If there are multiple users on one account (e.g., family members) then each user will preferably have a unique profile in the user database 198.

Users are also allocated storage space on the gateway's servers for their own use. Enhanced live or recorded broadcasts that contain information the user may want to reference later (e.g., the web address of the band currently playing) allow the listener to press a button on the multimedia device 20 to transmit and store that information on their user pages on the gateway 30.

The gateway 30 also provides navigation services through a dedicated computer 202 to the vehicle 184. The vehicle 184 provides location information from its GPS receiver 110 (FIG. 2) to the gateway 30, and the gateway 30 in turn provides mapping services to the vehicle showing travel routes or locations of interest. Coupled with the advertising database 196, drivers can see map locations related to recent advertisements and get navigation guidance to these locations. For example, the driver could get directions to the nearest chain restaurant whose commercial just played offering a lunch special.

The gateway 30 also transmits other software applications to the vehicle 184 for use in the multimedia device 20. These applications are referred to as channels and comprise the personal information services of the system 10 (navigation, email, etc.). These applications or channels can be downloaded to the vehicle 184 from a computer 204 at any time to instantly add to the features of the multimedia device 20.

The gateway 30 further transmits events to the vehicle based on preferences provided by the user in a user profile stored on a stand alone personal computer 206. Such events could be, for example, stock market alerts (i.e., set an alert when a stock reaches a set value), traffic alerts based upon the user's route (notifies of any delays as they happen in real time on the route), email messages, or the like.

Several types of remote programming devices 40 may send different types of data to the multimedia device 20, as shown in FIG. 1. Such devices 40 can also receive different types of data from the multimedia device 20 through the Internet gateway 30. Configuration data determines which formats of audio broadcasts (i.e., AM, FM, DAB, Internet broadcast) and information services (i.e., applications for navigation, stock reports, weather reports, etc.) can be received by the remote device 40, as well as what channels are associated with preset buttons 172 (FIG. 2).

Configuration data is preferably sent to the multimedia device 20 through a computer 206 with an Internet connection 208 using a web browser, as shown in FIG. 3. Due to the large number of possible analog, digital and Internet based broadcasts available for reception by the multimedia receiver 210 (FIG. 1), choosing from the huge variety of broadcasts is less complicated if it is preprogrammed or preconfigured in advance by the user through a remote computer 206 rather than from the multimedia device 20 itself. The user would log onto the Internet 208 in a manner generally known in the art and then access the configuration web page of the Internet gateway network 30. Once the user has configured the web page selections as desired, he/she could submit the changes. The new configuration could then be transmitted to the multimedia device 20 in the vehicle 184 from the gateway network 30.

Personal directory data could be transferred locally to the computer 206 using such local wireless technology as IrDA or Bluetooth. Examples of such remote devices 40 include notebook computers, PDAs or cellular phones. Examples of data transferred include phone books, address books and to-do lists. Those skilled in the art will appreciate that other remote devices 40 and data transferred are contemplated without departing from the essential spirit and scope of the invention. The computer's I/O controller (not shown) would constantly scan for transmission types it recognizes and once one is found it would initiate a data transfer.

Larger recorded audio files could be transmitted to the multimedia device 20 from embedded computers with fast, high bandwidth local area connections. An example of such a transfer would be the purchase of an MP3 audio file from a retail reseller such as a record store or gasoline station. Another example would be the transfer of personal MP3 files from the user's home computer 206 connected to the vehicle multimedia device 20 through an IEEE 802.11 standard wireless LAN.

Figure 4:
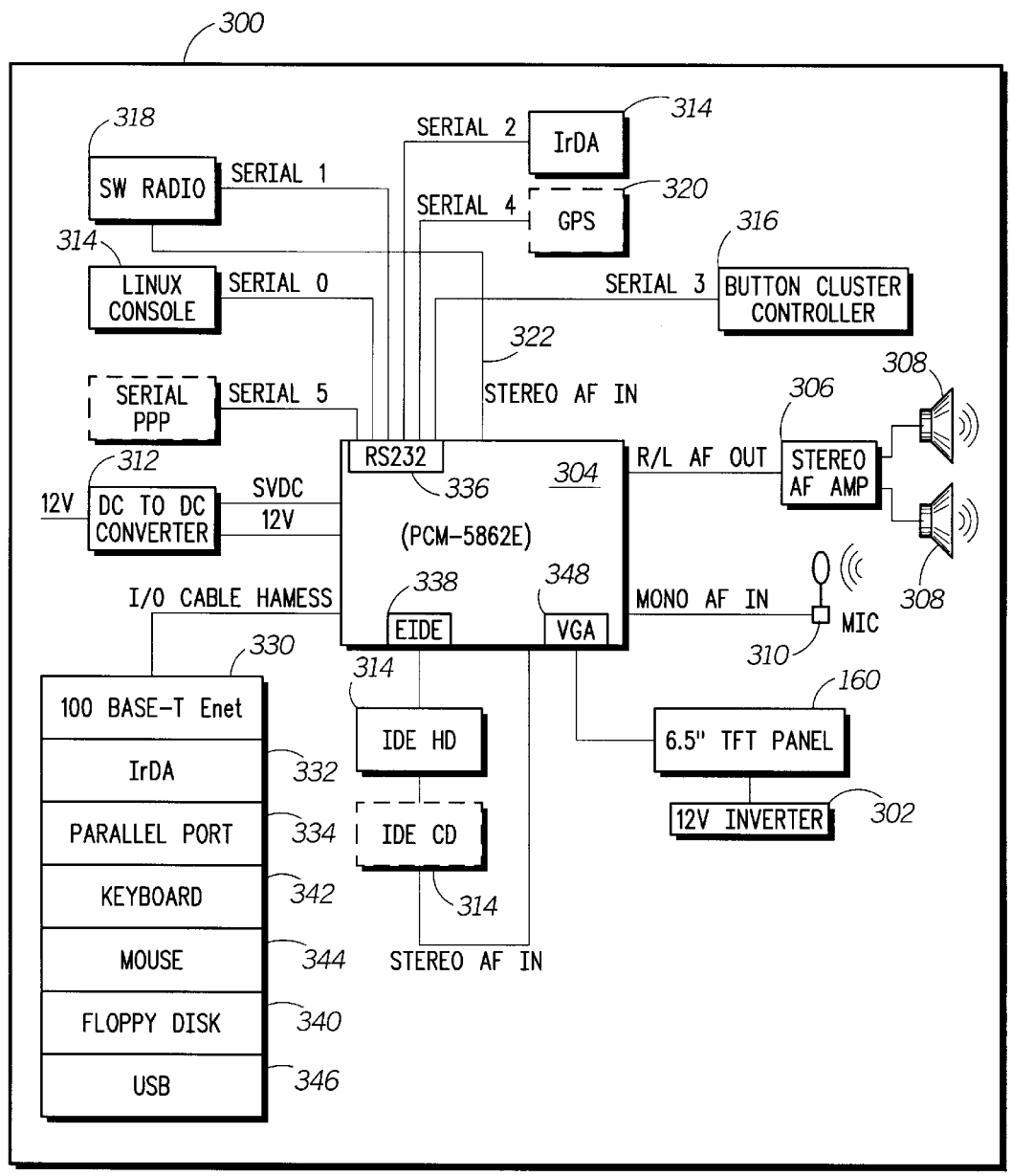
FIG. 4 is a block diagram of one presently preferred hardware platform.

Referring now to FIG. 4, one presently preferred hardware platform 300 is shown broken up into the various sections that make up the multimedia device 20 itself. Following is a description of the functions of the platform 300, as well as a functional description of one presently preferred front panel display 160. The front panel 160 is designed by Prisma Design International, Inc. In one embodiment, the front panel 160 may be a 6½ inch TFT flat panel displays powered by a 12 volt inverter 302.

The hardware platform 300 includes the components implementing the multimedia device 20. The multimedia device 20 is preferably built on an IBM PC compatible platform, running the RedHat version 6.0 Linux operating system. Many portions of the operating environment will be implemented in Java running in a VM process.

As shown in FIG. 4, the hardware platform 300 includes the following subassemblies or components. Principally, the hardware platform 300 includes a motherboard 304, a flat panel display 160, a stereo amplifier 306 and speakers 308, a microphone 310 and audio inputs 322, a power supply 312, peripheral devices 314, a button controller 316, a shortwave radio 318, and a global positioning system receiver 320. Each of these components is described in further detail below.

Multimedia Motherboard 304 preferably comprises a PCM-5862E Intel Pentium motherboard sold by Advantech Co., Ltd. The motherboard 304 preferably also includes most of the hardware devices required for the hardware platform 300, such as 100 Base-T 330, IrDA 332, Parallel Port 334, RS232 serial ports 336, IDE 338, Floppy disk 340, Keyboard and Mouse 342, 344, USB 346, CRT/TFT VGA controller 348, Sound (not shown), PC/104 expansion (not shown), 1 PCI slot (not shown).

The platform 300 display preferably is a 4" 640×480 256 color VGA panel. The LCD display preferably runs from 12 V DC. The platform 300 preferably includes an after market car stereo amplifier 306 capable of driving 5 speakers 308. The speakers 308 selected and placement is done by Prisma Design. The amplifier 306 has outputs for 2 right channels, 2 left channels, and a sub woofer. The microphone 310 and audio 322 inputs will feed into the sound subsystem of the computer 304. Some type of mixer is preferred. The presently preferred embodiment uses the Mic input, and Computer 304 sound out. Additional hardware may be required for Microphone audio pre-processing. The system runs on nominal 12 V DC (up to 13.8 volts actual). The computer 304 requires 7 Amps at nominal 5 Volts. A 2.5 inch laptop 4 Gigabyte drive is used. Cabling is also provided for a CDROM hookup. A microcontroller that takes the button events of button cluster controller 316 and turns them into serial codes. The first serial port 366 is preferably assigned to the Linux console. SW Radio 318 is a radio capable of tuning the radio spectrum under RS232 computer control. The radio preferably provides stereo output when in the domestic FM band.

While the multimedia device 20 can be operated with default settings, it should be preferably configured by the user after purchase for best use. Using a remote computer 206 with an Internet connection 208, the user preferably logs into the Internet gateway network 30 in a known manner. If the user has never created an account before, he/she will first answer a series of questions to create a user profile. The user registers information about the multimedia device 20 itself (e.g., identification number, model, etc.), provide billing information, provide information about the vehicle 184 if the device is an OEM installation, and complete the purchase interest profile so that advertisements can be directed to his vehicle 184 that meet the user's buying needs.

Next, the user indicates where the multimedia unit 20 is currently located. This information will be used to access the broadcaster database 194 and retrieve tuning and other related information about those local stations that may be received in this area. If the user subscribes to a digital satellite broadcast service, that broadcaster's channels will also be retrieved. Internet audio broadcasts will also be shown.

Figure 5:
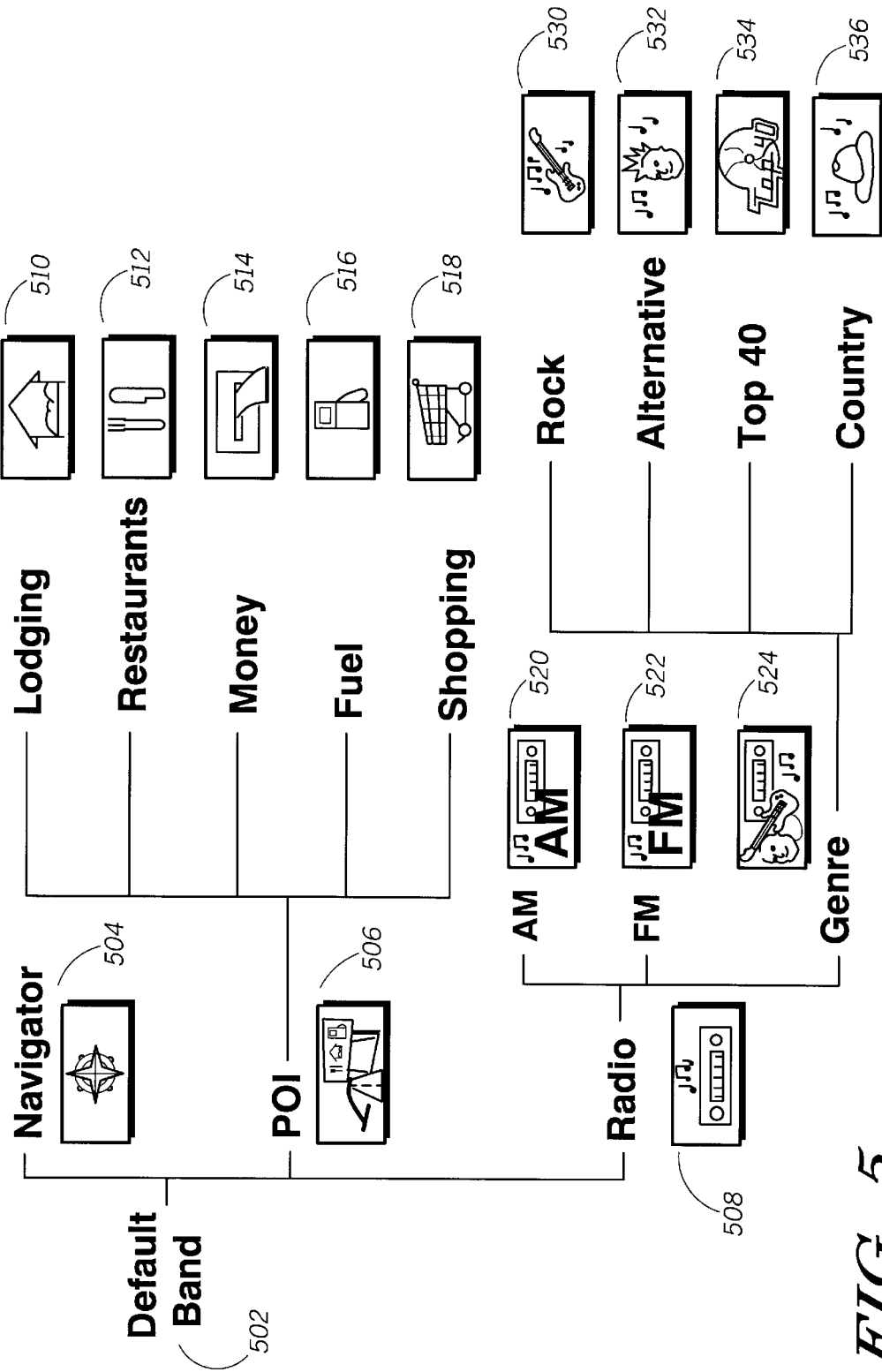
FIG. 5 illustrates an exemplary tree diagram providing a path to access content.

The user will then see a web page that will be dynamically created. It will contain all audio channels available in his area organized by format. FIG. 5 shows examples of the types of information that may be seen. By default, all formats and stations are selected. The user will then be able to check on or off which formats and individual stations he/she prefers to see on the device 20. Any format or station that is turned off will not appear on the radio display.

The user will also select those personal information channels (applications) such as stock reports 400, weather reports 402, traffic reports (not shown), etc. that the user wishes to use. These applications will be downloaded to the multimedia device 20 once the configuration session ends. The services shown will preferably grow over time as new features are added.

Turning now to FIG. 5, an exemplary tree diagram shows the various paths for as for selecting content according to the user interface of the present disclosure. A default band 502 is the original band from which a user could select other bands or content. Default band 502 includes all bands such as a navigator band 504, a point of interest (POI) band 506, and a radio band 508. While three exemplary bands are shown, any number of bands could be employed according to the present invention. Navigator band 504 will be discussed in more detail in reference to other figures. The point of interest band shows sub-bands lodging 510, restaurants 512, money 514, fuel 516, and shopping 518. The radio band 508 includes a AM band 520, and FM band 522 and a genre band 524. The Genre band also includes sub bands for various categories. In particular, a sub-bands rock 530, alternative 532, top 40 534 and country 536 are shown.

Figure 6:
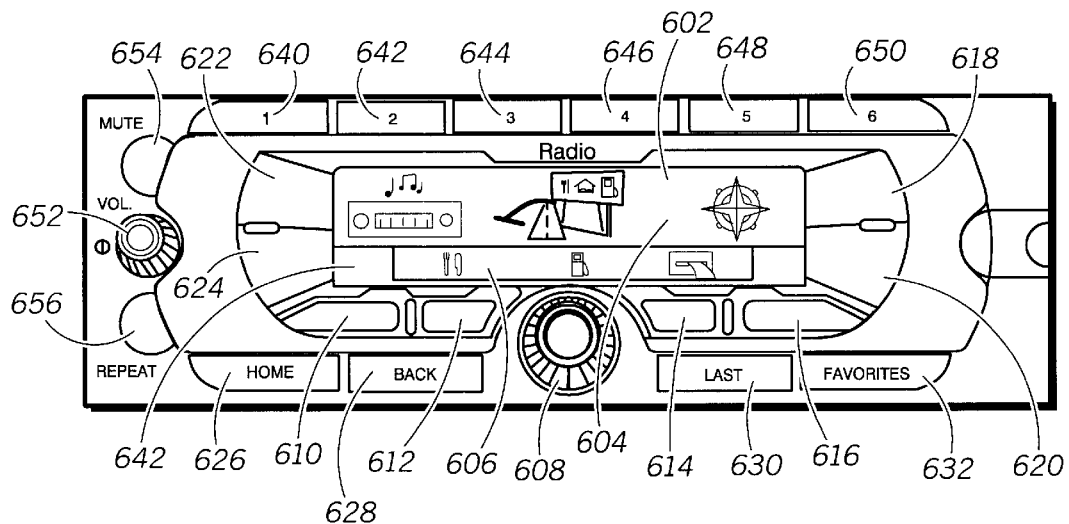
FIG. 6 is a display and associated user interface for accessing content according to the present invention.

Turning now to FIG. 6, a user interface for navigating the bands and sub-bands of FIG. 5 is shown. In particular, a display area 602 shows a band 604 showing the navigator icon, the point of interest icon 506 and the radio icon. Because the point of interest icon is selected, it is in the center of the display and highlighted as shown in FIG. 7B. The icons on either side of the highlighted icon are generally faint and displayed only to show that they are options that can be selected. Because the point of interest icon includes sub-bands, the sub-bands are shown in a sub-band 606 on the display. Sub-band 606 enables the user to see what options are available in the band. The user interface also includes a selector 608 which preferably can rotates and be pressed to select an option. Accordingly, the point of interest icon can be selected by pressing the selector 608, at which time the sub-band 606 will be displayed as a band. The icon in the center of the sub-band would than be highlighted with a further sub-band being display (if available).

The user interface of the present invention also includes a series of soft keys 610 through 616 below the display, and soft keys 618 through 624 on the sides. The operation of the soft keys will be describe in more details in reference to the; remaining figures. In addition to soft keys, the user interface includes a number of hard keys, which are standard functions of the user interface. In particular, these interfaces could include a "home" button 626, a "back" button 628, a "last" button 630, and a "favorites" button 632. In addition, the interface could include a number hard keys 640 through 650 to enable these selections of preset bands, sub-bands or contents, depending upon the location within the user interface. Also shown on the display is a power and volume control 652, a "mute" button 654 and "repeat" button 656.

Figure 7A:
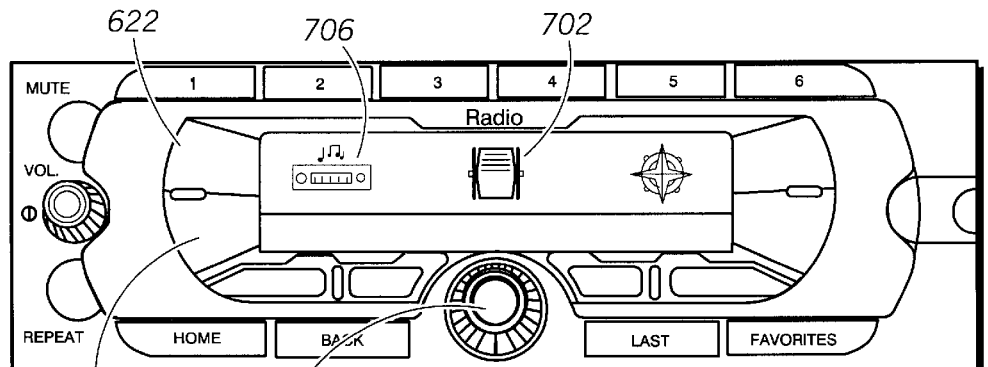
FIG. 7 is a series of figures showing the evolution of the display as content is selected.
Figure 7B:
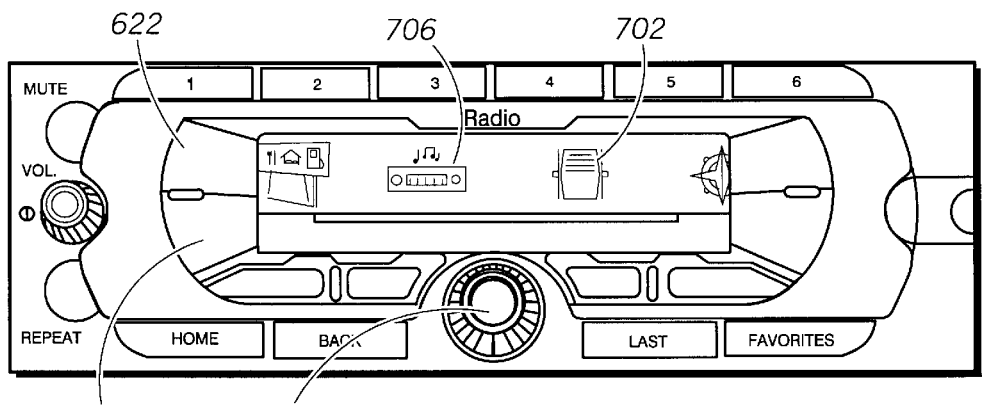
Figure 7C:
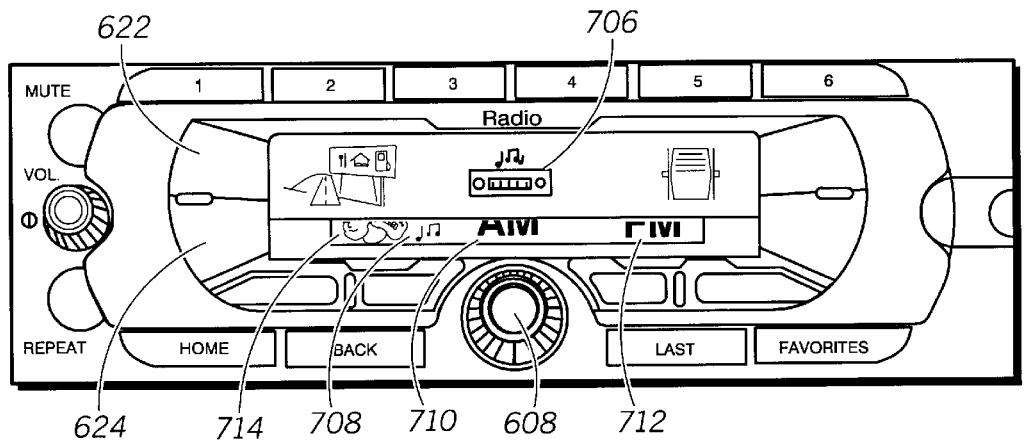
Figure 7D:
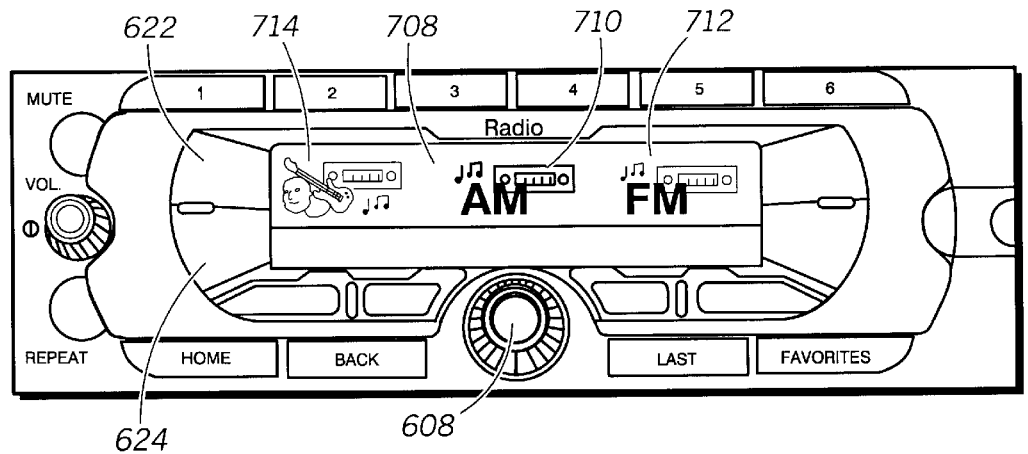
Figure 7E:
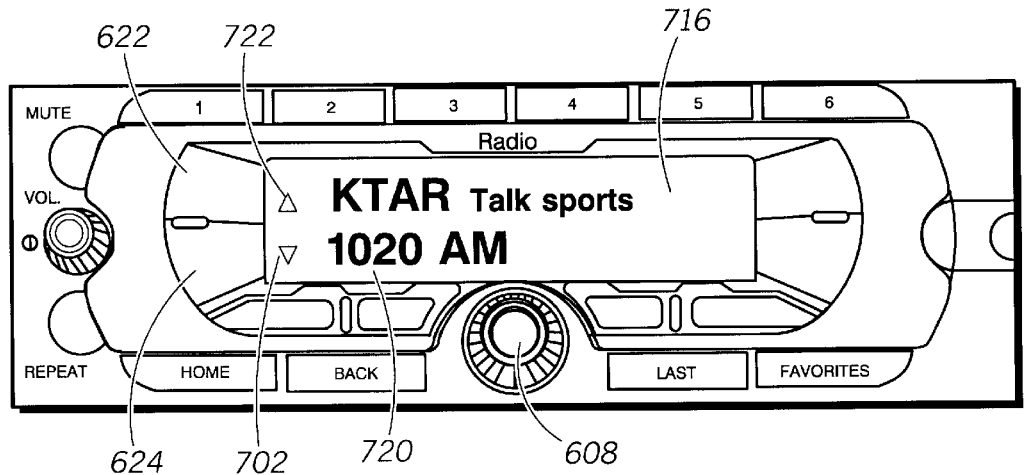

Turning now to FIG. 7, a series of displays FIGS. 7A through 7F shows the operation of band and sub-bands. In FIG. 7A, a calendar icon 702 is shown in the center of the display. If the selector is rotated in FIG. 7B, the radio icon 706 is moved toward the center of the display. As the icon reaches the center of the display, the radio icon 706 is highlighted, and the sub-band 708, having AM band 710, FM band 712, and genre band 714 are shown in FIG. 7C. As shown in FIG. 7D, when the selector knob is pushed, the sub-band is then displayed as the band in display, with AM band 710 shown highlighted in the display. The AM band is then selected by pressing the selector and a channel of the AM band is displayed as shown in FIG. 7E. In particular, KTAR talks sports band 718 (having the particular channel 720) is shown. According to the user of the present interface, soft keys 622 and 624 associated with arrows 722 and 724 could be used to curser through predetermined channels on the AM band as shown in FIG. 7E. Alternatively the selector 608 could be used to curser through the AM band to select any desired channel.

Figure 8:
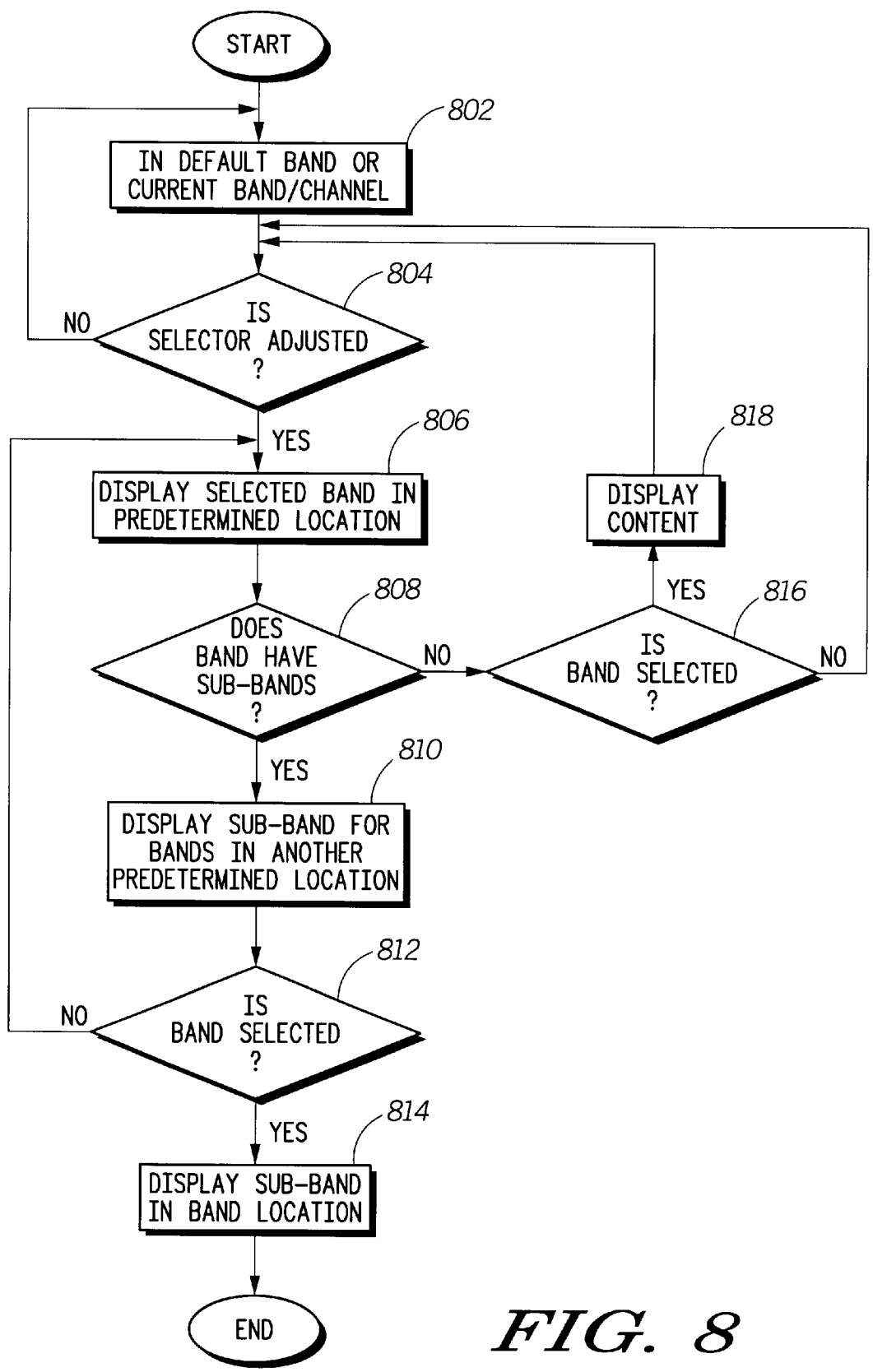
FIG. 8 is a flow chart showing steps for selecting content from a band or sub-band.
Figure 9A:
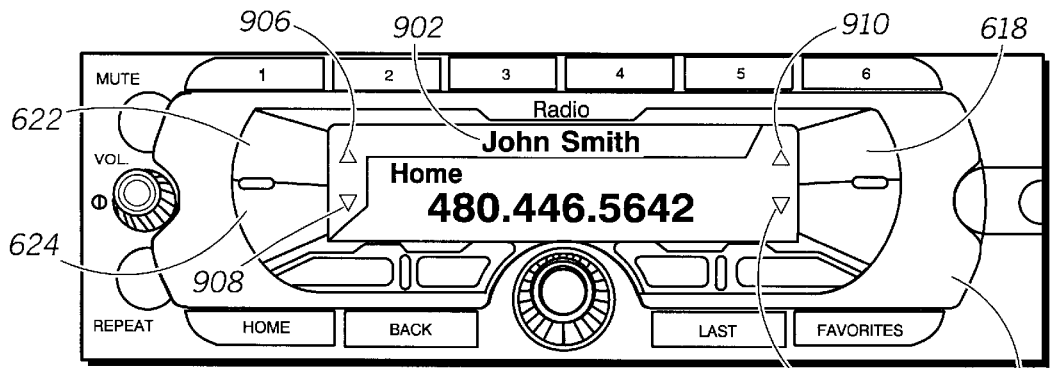
FIG. 9 is a series of figures showing the evolution of the display as a users exits from a selected entry.
Figure 9B:
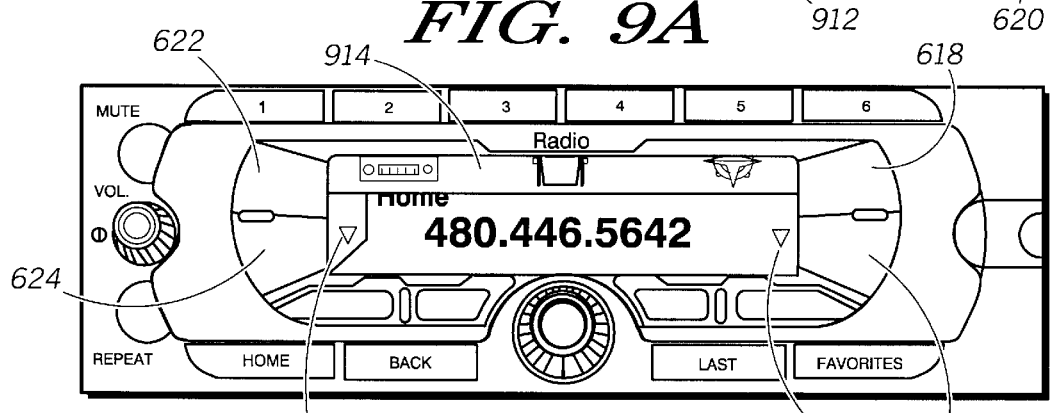
Figure 9C:
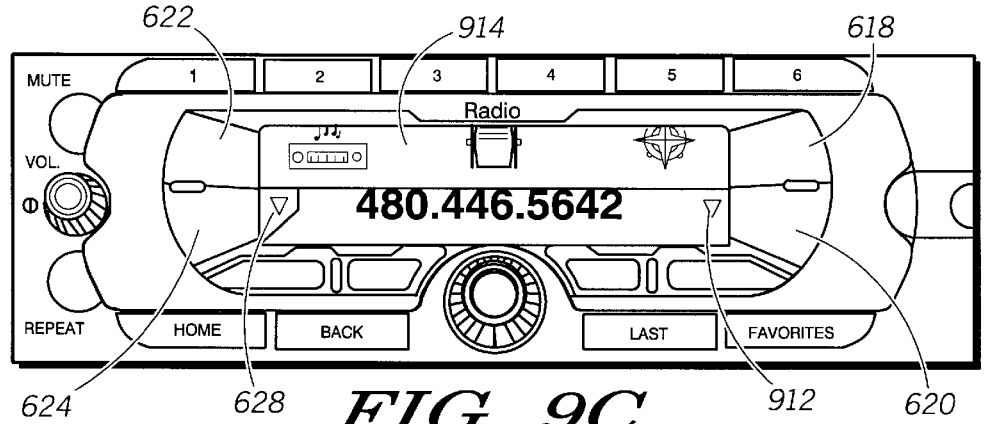
Figure 9D:
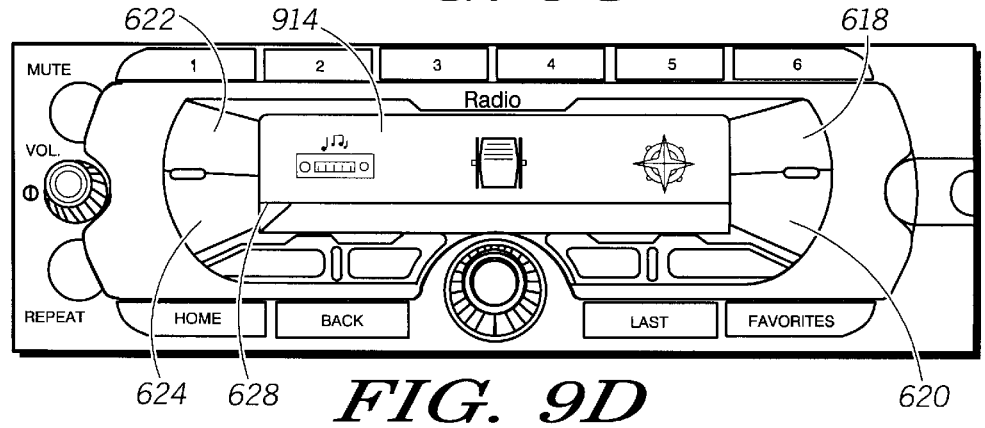

Turning now to FIG. 8, a flow chart shows the operation of the user interface for selecting a sub-band or content. The user interfaces is in a particular band, such as a default band or a current band at a step 802. Preferably, a particular channel is highlighted in the center of the display, with addition channels of the band shown in shadow. If a sub-band of the highlighted channel is available, the sub-band is preferably shown below the band and will enable the user to determine whether to select the band. It is then determined whether the selector is adjusted at a step 804. Although a dial enabling rotation and pushing is shown, any other device for selecting can be use. For example, a rocker arm, which would enable a user to curser through a channel in the band and select a particular channel could be used. If the channel sector is adjusted, the selected band is displayed in the predetermined location. Although these selected bands have been shown in highlighted in the center of the display, the selected band could be shown in some other location, such as on the left or right to enable a user to easy identify these selected bands. It is then determined at a step 808 if the band has sub-bands. If the bands have sub-bands, the sub-bands are displayed at another per determined location at a step 810. It is then determined at a step 812 if the band is selected. If the band is selected, the sub-band is then displayed at a band location at a step 814. If the band does not have sub-bands at step 808, it is then determined if the band is selected at 816. If a band is selected, content is display at a step 818.

Turning now to FIG. 9, a series of displays (FIG. 9A–FIG. 9D) shows the efficient use of a display according to the present disclosure. A particular address book content 902 for an individual is shown in FIG. 9A. Other calendar entries could be viewed by the use of soft key 622 and 624 which are shown to be available by arrows 906 and 908. Additional information, which is shown to be available by arrows 910 and 912, within a particular address book content can accessed by the use of soft keys 618 and 620. In FIG. 9B the operation of exiting content in turning to a band is shown. In particular, by rotating the selector, the band 904 having the calendar function is shown. Band 904 continuing to enter and fully occupying the display are shown in FIGS. 9-3 and 9-4.

Figure 10:
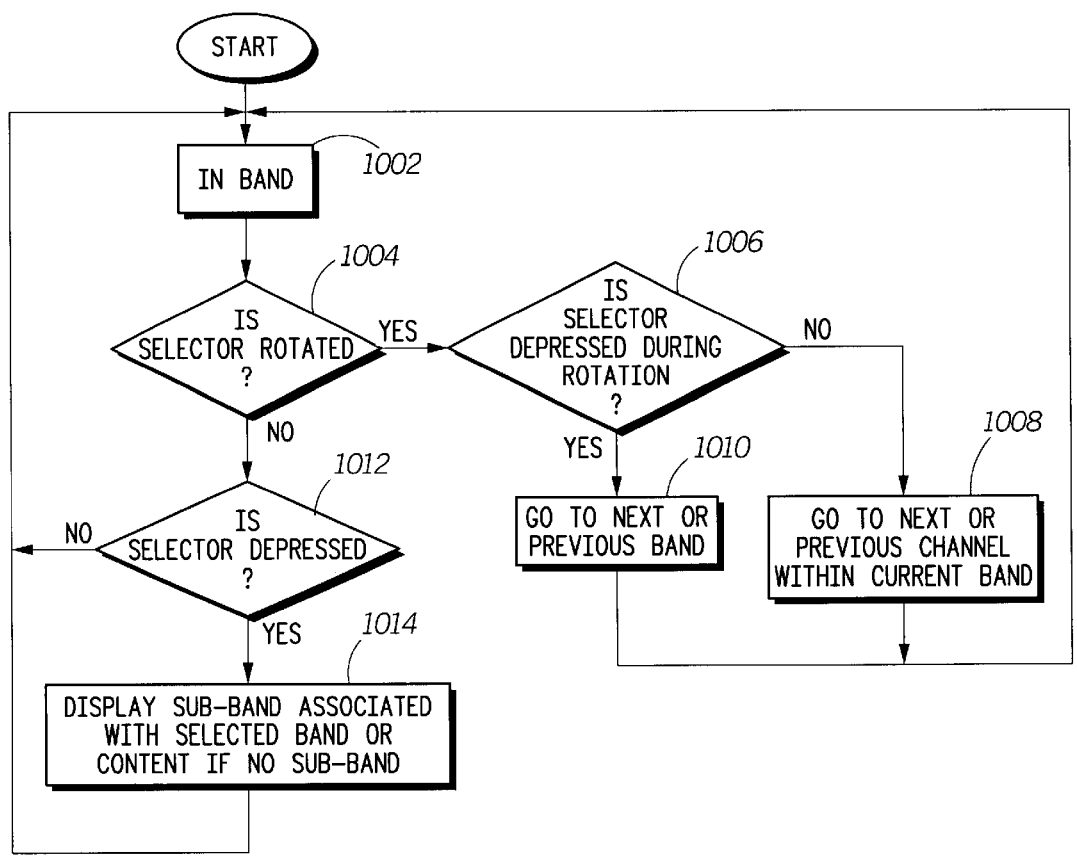
FIG. 10 is flow chart showing the steps for moving through the tree diagram of FIG. 5 according to an alternate embodiment of the present invention.
Figure 11A:
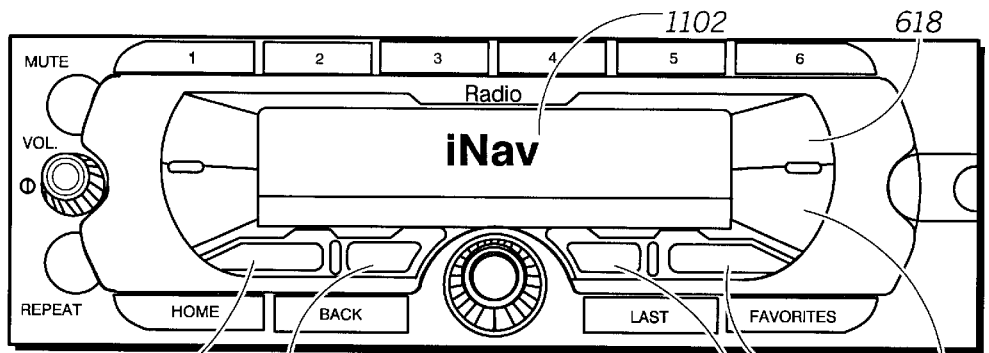
FIG. 11 is a series of figures showing display options for a navigation function according to the present invention.
Figure 11B:
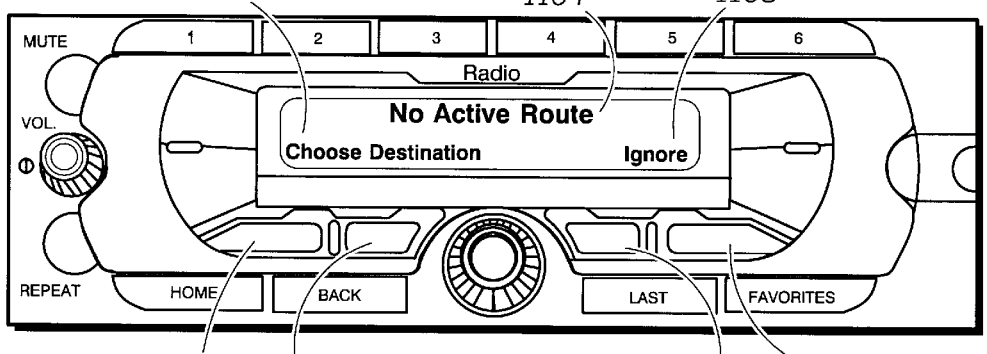
Figure 11C:
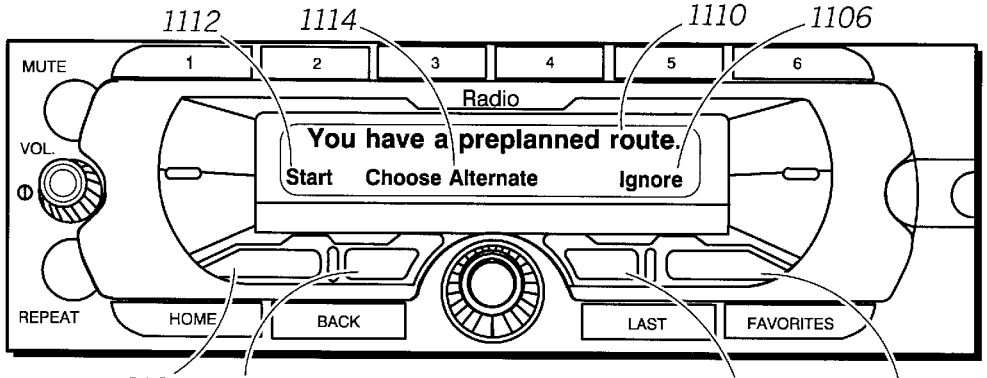
Figure 11D:
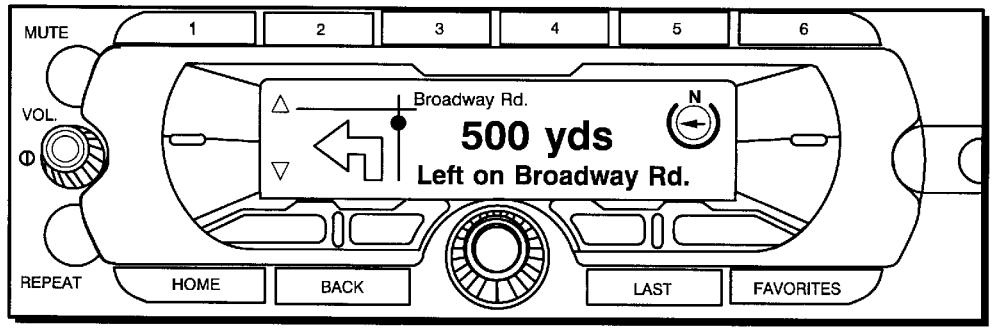

Turning now to FIG. 10, a flow chart shows the operation of the sector to enhance the ability of a user to curser through a menu according to the present invention. When a user is in a band at a step 1002, it will be determined whether the selector is rotated at a step 1004. If the sector is rotated, it is determined whether the tuner is depressed during the rotation a step 1006. If the tuner is not depressed, the next or the previous channel in a current band will be displayed in a step 1008. As described earlier, the next or previous channel will be highlighted in shown in a previous location as the center of the display. If the tuner is depressed during rotation, the next or previous band will be displayed as at step 1010 That is, rather that rotating through channels in a particular band, the user will be able to turn to the next or previous band by depressing the selection when rotating. If the selector is not rotated at step 1004, but is depressed at step 1012, the sub-band associated with the selected band will be displayed in place of the selected band at step 1014. If no sub-band is available, the content associate with the selected channel will be displayed.

Turning now to FIG. 11, a series of displays (FIG. 11A through FIG. 11D) shows the operation of the navigation band 504. The navigation channel icon 1102 is shown at the center of the display. Preferably, a user could select the navigation channel at any time during the operation of the user interface. When the navigation channel is selected, the display will show different information, depending upon the information provided by a user. As shown in FIG. 11B, no active route display 1104 is shown if no route has been selected by the user. The user is then given the option to choose a destination 1106 or to ignore 1108 as desired by the user. The soft keys enable the user to select to choose a destination or to ignore a route requested. If a route had been selected, a preplanned route display message 1110 is shown in FIG. 1C. If a pre-plan route has been entered by a user, the user is given the option to start the preplanned route 1112, to chose an alternative route at 1114, or ignore the preplanned route 1116. Finally, if the preplanned route 1112 is chosen, the route will be displayed as shown in FIG. 1D. If the user desires to choose an alternate route, a yellow page icon can be shown to enable the user to select destinations for a preplanned route.

Figure 12:
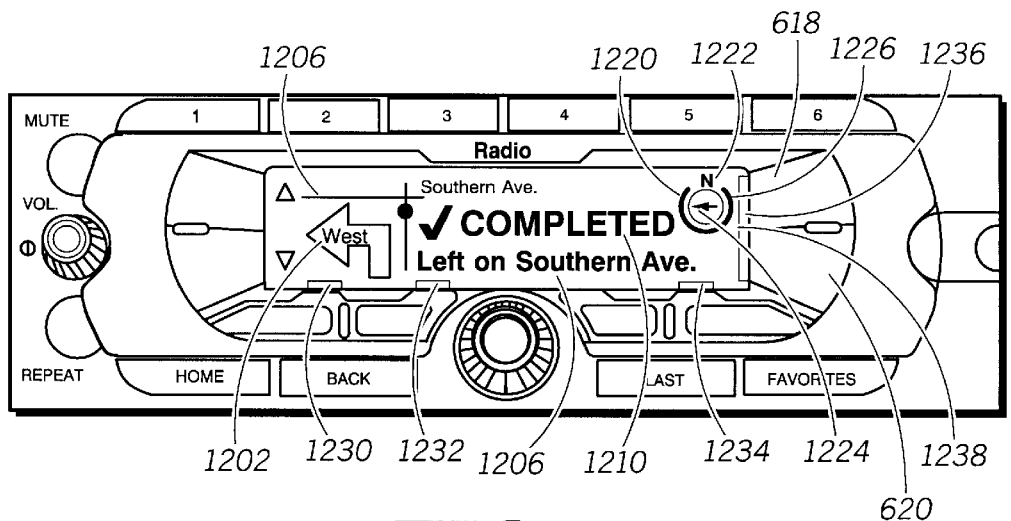
FIG. 12 is an exemplary display showing additional navigation functions according to the present invention.

Turning now to FIG. 12, a display showing the navigation guidance features is shown. A directional prompt 1202 and a text prompt 1204 are shown. Also, a street indicator 1206 is shown. The current state 1210 of the instructions is also shown in the center of the display. A navigation aide 1220 is also shown. The navigation aide includes the direction indication 1222. It also includes a destination indicator 1224 to indicate a direction of the destination. A route-completed gauge 1226 is also shown. The gauge enables a user to determine what percentage of his route has been completed.

Figure 13:
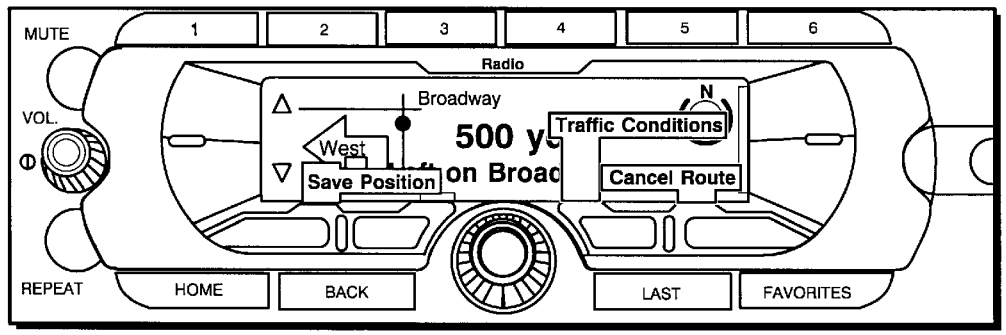
FIG. 13 is a an exemplary display showing additional navigation functions according to the present invention.
Figure 14:
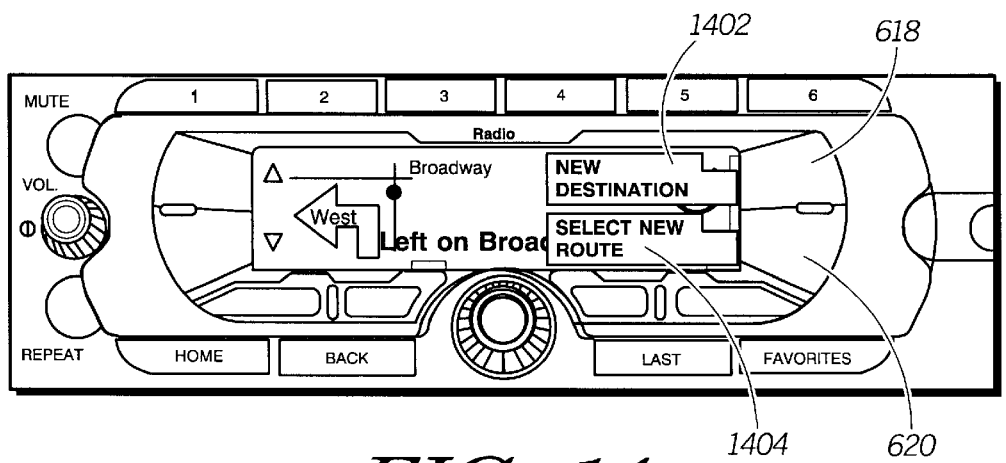
FIG. 14 is a an exemplary display showing additional navigation functions according to the present invention.

The display also includes tabs associated with the soft keys to enable a user to detect the presence of soft keys. In particular soft keys tabs 1230, 1232 and 1234 are associated with three of the soft keys below the display. If any one of these soft keys below the display is selected, all of the options associated with all of the soft keys will preferably be displayed as shown in FIG. 13. Similarly, soft key indicator 1236 and 1238 are associated with the soft keys 618 and 620, which are on the side. If either of these soft keys are selected, the information for all of the side keys will be displayed, as shown in FIG. 14. Preferably, information associated with either the side soft keys or the lower soft keys are shown at any particular time.

It is to be understood that a wide range of changes and modifications to the embodiments described above will be apparent to those skilled in the art and are contemplated. For example, although the bands and sub-bands are displayed horizontally, vertical bands could also be used in a larger display, such as a dual DIN slot receiver. Also, any number of sub-bands (or super bands) could be displayed. It is therefore intended that the foregoing detailed description be regarded as illustrative, rather than limiting, and that it be understood that it is the following claims, including all equivalents, that are intended to define the spirit and scope of the invention.

We claim:

1. A method of enabling the selection of content on a multimedia device comprising the steps of:

displaying a band, wherein the band is displayed graphically as a horizontally rotating belt having a plurality of icons, wherein each of the plurality of icons has one of a horizontally rotating sub-band and the content associated with it, and wherein the horizontally rotating band comprises a dynamic number of icons;

displaying the band with one of the plurality of icons highlighted in a predetermined location; and displaying the horizontally rotating sub-band associated with the one of the plurality of icons highlighted.

2. The method of claim 1, further comprising selecting the one of the plurality of icons highlighted.

3. The method of claim 2, further comprising displaying the plurality of icons except for the one of the plurality of icons highlighted in shadow.

4. The method of claim 2, further comprising displaying one of the horizontally rotating sub-band and the content in place of the band when the one of the plurality of icons is selected.

5. A method of enabling the selection of content on a multimedia device comprising the steps of:

displaying a band, wherein the band is displayed graphically as a horizontally rotating belt having a plurality of icons, wherein each of the plurality of icons has one of a horizontally rotating sub-band and the content associated with it, and wherein the horizontally rotating band comprises a dynamic number of icons;

highlighting one of the plurality of icons; and displaying the band with the one of the plurality of icons highlighted in a predetermined location.

6. The method of claim 5, further comprising displaying the horizontally rotating sub-band associated with the one of the plurality of icons highlighted.

7. The method of claim 6, further comprising displaying one of the horizontally rotating sub-band and the content in place of the band when the one of the plurality of icons is selected.

8. The method of claim 5, further comprising displaying the plurality of icons except for the one of the plurality of icons highlighted in shadow.

9. A method of enabling the selection of content on a multimedia device comprising the steps of:

displaying a band, wherein the band is displayed graphically as a horizontally rotating belt having a plurality of icons, wherein each of the plurality of icons has one of a horizontally rotating sub-band and the content associated with it, and wherein the horizontally rotating band comprises a dynamic number of icons;

highlighting one of the plurality of icons;

displaying the band with the one of the plurality of icons highlighted in a predetermined location;

displaying the plurality of icons except for the one of the plurality of icons highlighted in shadow;

displaying the horizontally rotating sub-band associated with the one of the plurality of icons highlighted; and displaying one of the horizontally rotating sub-band and the content in place of the band when the one of the plurality of icons is selected.

10. An apparatus for displaying content on a multimedia device comprising:

a display;

a band on said display, wherein the band is displayed graphically as a horizontally rotating belt having a plurality of icons, wherein the horizontally rotating band comprises a dynamic number of icons; and wherein the band with one of the plurality of icons highlighted is positioned in a predetermined location; and one of a horizontally rotating sub-band and the content associated with the one of the plurality of icons highlighted.

11. The apparatus of claim 10, wherein the one of the plurality of icons is selected.

12. The apparatus of claim 11, wherein the plurality of icons except for the one of the plurality of icons highlighted are displayed in shadow.

13. The apparatus of claim 10, wherein one of the horizontally rotating sub-band and the content is displayed in place of the band when the one of the plurality of icons is selected.

14. In a vehicle, a method of enabling the selection of content on a multimedia device comprising the steps of:

displaying a band, wherein the band is displayed graphically as a horizontally rotating belt having a plurality of icons, wherein each of the plurality of icons has one of a horizontally rotating sub-band and the content associated with it, and wherein the horizontally rotating band comprises a dynamic number of icons;

displaying the band with one of the plurality of icons highlighted in a predetermined location; and displaying the horizontally rotating sub-band associated with the one of the plurality of icons highlighted.

15. The method of claim 14, further comprising selecting the one of the plurality of icons highlighted.

16. The method of claim 15, further comprising displaying the plurality of icons except for the one of the plurality of icons highlighted in shadow.

17. The method of claim 15, further comprising displaying one of the horizontally rotating sub-band and the content in place of the band when the one of the plurality of icons is selected.

* * * * *